(12) United States Patent
Menssen et al.

(10) Patent No.: US 9,108,132 B2
(45) Date of Patent: Aug. 18, 2015

(54) FILTER INSERT AND FILTER DEVICE

(75) Inventors: Joerg Menssen, Tamm (DE); Stefan Becker, Mannheim (DE); Kai Hilarius, Roemerberg (DE); Oliver Steins, Roemerberg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 344 days.

(21) Appl. No.: 13/445,325

(22) Filed: Apr. 12, 2012

(65) Prior Publication Data

US 2013/0152526 A1 Jun. 20, 2013

(30) Foreign Application Priority Data

Oct. 12, 2009 (DE) .......................... 10 2009 049 170

(51) Int. Cl.
*B01D 46/00* (2006.01)
*B01D 46/24* (2006.01)
*B01D 45/16* (2006.01)
(Continued)

(52) U.S. Cl.
CPC ............ *B01D 46/0005* (2013.01); *B01D 45/16* (2013.01); *B01D 46/0004* (2013.01); *B01D 46/0006* (2013.01); *B01D 46/009* (2013.01); *B01D 46/0013* (2013.01); *B01D 46/0023* (2013.01); *B01D 46/2411* (2013.01); *B01D 46/2414* (2013.01); *B01D 46/2418* (2013.01); *B01D 46/521* (2013.01); *B01D 46/525* (2013.01); *B01D 50/002* (2013.01); *F02M 35/0203* (2013.01); *F02M 35/024* (2013.01); *B01D 46/2422* (2013.01); *B01D 2046/2492* (2013.01); *B01D 2265/025* (2013.01); *B01D 2271/02* (2013.01); *B01D 2271/022* (2013.01);

(Continued)

(58) Field of Classification Search
CPC ........... B01D 46/0005; B01D 46/0006; B01D 46/2414; B01D 46/525–46/527; B01D 2271/022
USPC ...................................................... 55/480, 481
See application file for complete search history.

(56) References Cited

U.S. PATENT DOCUMENTS 6,231,630 B1    5/2001   Ernst et al.
6,808,547 B2 *  10/2004  Ota et al. ........................ 55/478

(Continued)

FOREIGN PATENT DOCUMENTS

DE          29819335 U1    4/1999
DE       102008011186 A1   9/2009

(Continued)

OTHER PUBLICATIONS

International search report for PCT/EP2010/064930.

*Primary Examiner* — Robert Clemente
(74) *Attorney, Agent, or Firm* — James Hasselbeck

(57) ABSTRACT

A filter insert has a filter element with an end surface at an inlet side and an end surface at an outlet side that are spaced from one another in a main flow direction of the filter insert. A frame circumferentially extends about lateral sides of the filter element. An axial seal is supported on the frame and has a sealing direction in or opposite to the main flow direction. When inserted into a filter housing and contacting a sealing surface of the filter housing, the seal separates seal-tightly the inlet and outlet. The frame has on two opposite lateral sides of the filter element contact surfaces for clamping the filter insert by matching clamping elements. The contact surfaces are oriented opposite to the sealing direction and each have an individual profile of varying height extending along the two opposite lateral sides.

30 Claims, 6 Drawing Sheets

(51) Int. Cl.
   *B01D 46/52*   (2006.01)
   *B01D 50/00*   (2006.01)
   *F02M 35/02*   (2006.01)
   *F02M 35/024*  (2006.01)

(52) U.S. Cl.
   CPC ....... *B01D 2275/208* (2013.01); *B01D 2279/60* (2013.01)

(56)          References Cited

U.S. PATENT DOCUMENTS

| | | | |
|---|---|---|---|
| 7,323,029 B2 * | 1/2008 | Engelland et al. | 55/502 |
| 7,351,270 B2 * | 4/2008 | Engelland et al. | 55/502 |
| 7,597,735 B2 * | 10/2009 | Terres et al. | 55/495 |
| 7,682,416 B2 * | 3/2010 | Engelland et al. | 55/481 |
| 7,708,797 B2 * | 5/2010 | Kuempel et al. | 55/521 |
| 7,713,321 B2 * | 5/2010 | Kuempel et al. | 55/481 |
| 7,736,410 B2 * | 6/2010 | Kuempel et al. | 55/481 |
| 7,972,404 B2 * | 7/2011 | Kuempel et al. | 55/521 |
| 7,972,405 B2 * | 7/2011 | Engelland et al. | 55/521 |
| 8,012,233 B2 * | 9/2011 | Kuempel et al. | 55/521 |
| 8,048,188 B2 * | 11/2011 | Widerski et al. | 55/521 |
| 8,147,582 B2 * | 4/2012 | Engelland et al. | 55/480 |
| 8,343,245 B2 * | 1/2013 | Coulonvaux et al. | 55/357 |
| 8,657,900 B2 * | 2/2014 | Menssen | 55/337 |
| 8,808,417 B2 * | 8/2014 | Engelland et al. | 55/502 |
| 2004/0020177 A1 * | 2/2004 | Ota et al. | 55/481 |
| 2007/0289265 A1 | 12/2007 | Colonvaux | |
| 2008/0022641 A1 * | 1/2008 | Engelland et al. | 55/521 |
| 2010/0313533 A1 | 12/2010 | Muenkel | |
| 2011/0099960 A1 * | 5/2011 | Menssen et al. | 55/480 |

FOREIGN PATENT DOCUMENTS

| | | |
|---|---|---|
| WO | WO0395068 A1 | 11/2003 |
| WO | 2009/106593 A1 | 9/2009 |
| WO | WO2009106591 A2 | 9/2009 |

* cited by examiner

FILTER INSERT AND FILTER DEVICE

CROSS REFERENCE TO RELATED APPLICATIONS

This application is a US Bypass Continuation application of International Application No. PCT/EP2010/064930 having a filing date of Oct. 6, 2010 and designating the United States, the International Application claiming a priority date of Oct. 12, 2009 based on prior filed German patent application No. 10 2009 049 170.8, the entire contents of the aforesaid international application and the aforesaid German patent application being incorporated herein by reference.

TECHNICAL FIELD

This disclosure relates generally to a filter insert, in particular intake air filter insert for internal combustion engines. The disclosure further relates to a filter device having a filter insert and a filter housing with an inlet area and an outlet area for media to be filtered, wherein the inlet area or the outlet area has a receiving area with an annular sealing surface that matches the seal of the filter insert.

BACKGROUND OF THE INVENTION

DE 198 49 089 A1 discloses a filter, especially for the intake air of internal combustion engines, that comprises a housing with a raw air inlet and a clean air outlet as well as a filter element arranged in the housing and substantially consisting of a star-shape folded filter material, wherein the housing is of a two-part or three-part configuration and is comprised of a cylindrical housing wall, a detachably connected cup and a cover at the clean air side.

WO2008/080129 A1 discloses a filter insert comprising a frame that on two sides has several planar and slanted sections. A variable use with respect to different types of filter elements and filter media is not proposed.

SUMMARY OF THE INVENTION

The invention has the object to design filter devices of a similar configuration to be variable in a controllable fashion, especially such that for variants of filter elements the same housing configuration can be used and, at the same time, it can be ensured that only filter elements having certain properties can be used.

The invention concerns a filter insert including:

a) A filter element with an end surface at the inlet side and an end surface at the outlet side wherein the direct connection of the end surface at the inlet side and the end surface at the outlet side corresponds to the macroscopic main flow direction, especially relative to the filter device as a whole.

b) A frame circumferentially extending about the lateral sides of the filter element and connected to the filter element, wherein the frame supports an axial seal whose sealing direction is oriented in or opposite to the main flow direction, wherein the seal in the sealing direction can be contacted with a sealing surface of a filter housing so that the inlet side of the filter insert can be separated seal-tightly from the outlet side; wherein the frame in the area of one of the end surfaces has on two opposite lateral sides of the filter element a first contact surface and a second contact surface for clamping the filter element by means of a first clamping element and a second clamping element, wherein the contact surfaces are substantially oriented opposite to the sealing direction, wherein the contact surfaces each have a height profile, wherein the contact surfaces each have an individual height profile extending along the lateral sides.

The invention further concerns a filter insert, especially intake air filter insert for internal combustion engines, especially for use in a filter device according to the invention, including:

a) A filter element with an end surface at the inlet side against which in particular the raw air flow is guided and an end surface at the outlet side where filtered air leaves the filter element in operation.

b) A frame that extends circumferentially about the lateral sides of the filter element that are not flowed through and that is connected to the filter element and has an axial seal that can be pressed against a sealing surface of a filter housing in sealing direction, wherein the frame on two opposed lateral sides of the filter element has a first contact surface and a second contact surface for clamping the filter insert in a filter housing by means of a first clamping element and a second clamping element, wherein the normals of the contact surface are oriented substantially opposite to the sealing direction and have a height profile, wherein the first contact surface has a first height profile and the second contact surface has a second height profile that differs from the first height profile, wherein the filter insert especially by means of two clamping elements can be clamped in a housing, wherein the clamping elements each have a counter shape relative to the two height profiles.

The sealing direction is in this connection the direction in which the axial seal is to be pressed against a sealing surface in order to generate a sealing action.

Filter inserts according to the present invention have the advantage that for different such filter inserts, that may be provided for example, with different filter media and therefore may have different performance characteristics in regard to dust capacity, differential pressure, moisture resistance and flame resistance, individual frames and corresponding individual clamping elements can be provided, wherein for all variants the same housing configuration can be used.

In this way, with minimal expenditure, variants of filter devices can be formed for which the same housing can be used, wherein for each variant an individual combination of frame geometry and geometry of the clamping elements is employed.

Advantageously, in this way for defined application purposes, it can be ensured by predetermining the shape of the clamping elements that only filter elements with certain properties can be employed.

For example, for a certain internal combustion engine whose intake air is to be purified by the filter insert according to the invention, it can be ensured that only filter elements with filter media can be used that have a satisfactory moisture resistance for the designated use. Accordingly, a simple adaptation of working machines and drive devices to different sites of use and conditions of use is made possible, wherein an optimal filtration performance can be achieved for the environmental conditions in question, respectively.

It is especially advantageous that the adaptation of the filter device to the respective boundary conditions can be realized directly at the site of use, wherein only the clamping elements must be adapted.

In one embodiment the sealing direction is oriented in the main flow direction, i.e., the seal is pressed in the main flow direction. In an alternative embodiment the sealing direction is opposite to the main flow direction.

In one embodiment, the height of the height profile is defined by the spacing of the respective contact surface section from the plane that is defined by the seal of the filter insert.

In one embodiment, the height profile has at least two adjoining sections wherein one section is extending at an angle to the end surface of the outlet side and the adjoining section extends parallel to the end surface of the outlet side of the filter insert. In addition, or as an alternative, sections with non-continuous slant such as circle sectors or parabola sectors or other curve shapes can be used.

In one embodiment, the height profiles have a common preferred direction along two oppositely positioned lateral sides of the filter element and the height predominantly ascends along the preferred direction, wherein the ascent is continuous or takes place in several steps.

According to one embodiment, the preferred direction defines the mounting direction of the filter insert into a filter housing.

In one embodiment, the frame in the area of the first and/or the second lateral side has at least one groove for positioning the filter insert during assembly, wherein this groove extends parallel to the plane that is defined by the seal between this plane and the contact surface and undercuts in a direction opposite to the preferred direction a part of the height profile.

This groove has the advantage that, by interaction with a tongue that is formed by a rib on a sidewall of the filter housing, the filter insert when inserted into the filter housing is guided in an optimal position inside the filter housing at the end of the insertion process so that canting or turning of the filter element can be prevented.

Moreover, the groove for certain filter insert variants may be provided only at a certain side so that additional variants with different filter housings are enabled also whose geometry, by elimination of the ribs, can be adjusted accordingly in a simple way. For example, for applications that require moisture resistance, it is possible to principally provide a rib on one side while at the same time filter inserts that are not moisture resistant never have a groove on the side in question. At the same time, by means of the different geometries of frame and clamping elements still a differentiation of further properties such as flame resistance etc. can be achieved.

According to a further embodiment, the frame is arranged in the area of the end surface at the inlet side or the end surface at the outlet side and is connected to an annular end disk that covers the end surface partially in an outer area and has a flow-through opening allowing passage of flow therethrough, wherein on the end disk, inside the seal, an annular rib that extends partially or completely in the circumferential direction is arranged that projects away from the end disk and intersects the surface that is defined by the sealing surface of the seal when in the unclamped state. The annular shape can be circular or elliptical or oval.

The circumferentially extending rib is formed in this connection such that it is immersed into an opening of the housing and is surrounded by it, wherein the opening is arranged inside the sealing surface of the housing.

This has the advantage that, upon insertion of a filter insert, the seal will not contact, or only slightly contact, the sealing surface across a large initial portion of the insertion travel so that it is prevented that particles that adhere in the area of the sealing surface on the inner housing wall will become detached by the seal upon insertion of the filter insert and reach the clean side.

In an advantageous further embodiment, the rib that extends annularly is provided with an increased height in the area that is facing the housing lid, wherein this area penetrates farther into the opening inside the sealing surface of the housing than the remaining area. When mounting the filter insert in overhead position from the bottom to the top in a housing, the raised portion is supported in the opening as soon as the filter insert is completely inserted and prevents the filter insert from falling out. In this way, the assembly is facilitated because the filter insert and a subsequently attached housing lid that secures the filter insert can be mounted sequentially without having to secure the filter insert manually in position.

Alternatively, the circumferentially extending rib can also be arranged outside of the seal; in this case, a recess or groove must be provided in the housing outside of the sealing surface.

In one embodiment, on the frame a first and a second projections are arranged so as to adjoin the contact surfaces and, in the mounting direction, extend past the projected annular surface of the seal.

These projections interact with a ramp contour that is provided in the interior of the filter housing on the two lateral walls, respectively, wherein the ramp surfaces of the ramp contour are oriented in a direction of a receiving area, wherein the spacing of the ramp surface to the receiving surface decreases in the mounting direction, wherein the projections on the frame upon insertion of the filter insert can be guided by the ramp surface in the direction toward the sealing surface so that the filter insert is positioned such that the rib of the housing can engage the groove of the filter insert.

This has the advantage that the filter insert upon insertion is guided stepwise with increasingly diminished possible play into its end position without the guiding action producing an increased resistance by friction. Moreover, at the beginning of the assembly process no great precision is required for the placement of the filter insert. Moreover, the risk of canting of the filter insert upon insertion is reduced and the filter insert is pre-positioned such that the clamping elements must not overcome a large distance between the loose position in the completely inserted state and the working position in the clamped and seal-tight state.

In one embodiment, the filter insert has at its lateral sides in the area of the end surface opposite the frame at least two spacer knobs of elastic material. They are designed advantageously such that they achieve in the mounted state a no-vibration support of the filter insert in the housing.

The filter insert according to the invention can have different types and configurations of filter elements.

In one embodiment, the filter element has at least one annular star-shape folded filter medium wherein the end faces of the filter medium form the end surfaces at the inlet and outlet sides of the filter element.

In an advantageous embodiment, the filter insert has two annular star-shape folded filter media bellows wherein a small filter media bellows is arranged concentrically in a large filter media bellows wherein the frame in the area of a first end surface is connected seal-tightly to the large filter media bellows, wherein in the area of the first end surface the interior of the small filter media bellows is completely closed off, and wherein in the area of the second end surface the end faces of the two filter media bellows are seal-tightly connected to one another.

In this connection, the outer filter media bellows in one embodiment can be flowed through from the exterior to the interior and the inner filter media bellows from the interior to the exterior. In this embodiment, the frame and the seal of the filter insert are located in the area of the end surface of the filter element at the outlet side. Alternatively, the opposite flow direction is conceivable.

In one embodiment, the filter element is a compact air filter element with a plurality of passages that are alternatingly closed off in the area of the end surfaces, especially formed by alternatingly positioned layers of a flat filter medium and a corrugated filter medium.

In one embodiment, the filter element is a rectangular zigzag-folded filter element, wherein the end surfaces of the filter element are formed by the fold edges.

The invention concerns furthermore a filter insert with a filter medium and an end disk, wherein on the end disk a circumferentially extending axial or radial seal is arranged and the end disk comprises a circumferentially extending rib.

The invention further concerns a filter device, comprising a filter insert according to one of the described embodiments and a filter housing with an inlet area and an outlet area for the medium to be filtered, wherein the inlet area or the outlet area has a receiving area with an annular sealing surface that matches the seal of the filter insert.

In one embodiment, on one housing side a mounting opening is provided through which the filter insert is insertable into the housing in a mounting direction that is perpendicular to the main flow direction. In this connection, the mounting opening is closable by a lid, in particular in a seal-tight fashion, wherein on the lid two clamping brackets are arranged that project into the filter housing, wherein the first clamping bracket extends along the first lateral side of the filter insert and the second clamping bracket extends along the second lateral side of the filter insert. The clamping brackets have clamping surfaces that are oriented in the direction toward the receiving area, wherein the clamping surfaces each have a height profile, wherein the height profiles of the clamping surfaces match the corresponding height profiles of the contact surfaces arranged on the frame and form a counter shape relative to them. When the lid is mounted and the clamping brackets project completely into the filter housing, the clamping brackets apply a force onto the corresponding contact surfaces of the filter insert in such a way that the seal of the filter insert is forced against the sealing surface of the housing and the filter insert is thereby secured within the housing.

In one embodiment, two expanded housing sections are provided in the housing walls and have planar support surfaces that are facing in the direction toward the receiving area on which the planar support surfaces of the clamping brackets are supported that are located opposite the clamping surfaces.

In one embodiment of the filter device, in the filter housing at least one rib is provided that is arranged on one lateral side of the filter housing and extends, beginning at the bottom of the filter housing, in the direction toward the mounting opening, wherein the rib is designed such that it engages the groove of the filter insert upon mounting of the filter insert.

In one embodiment, the interior of the filter housing has a ramp contour at both sidewalls, respectively, whose ramp surface is facing toward the receiving area, wherein the spacing of the ramp surface to the receiving surface decreases in the mounting direction, wherein, upon mounting of the filter insert, the projection of the end disk can be guided by the ramp surface in the direction toward the receiving area so that the filter insert is positioned such that the rib of the housing can engage the groove of the filter insert.

In one embodiment, the mounting opening is cut deeper into the sidewall of the housing on the side of the receiving area where the frame of the filter insert is received as compared to the area of the other end surface of the filter insert.

In one embodiment, the mounting opening at the inlet side is delimited by a bow member on which is arranged a tilting rib projecting into the interior that is contacted by the filter insert when it is tilted within the housing. In this way, it is prevented that the filter insert when being removed will catch on the bow member.

In one embodiment, the filter housing has inside the sealing surface an opening wherein the opening is designed such that it surrounds the annular rib that extends partially or completely in the circumferential direction on the end disk of the filter insert when the filter insert is completely inserted in the mounting direction into the filter housing, the opening.

The invention concerns moreover a product group of filter devices comprising housing variants with lid variants and filter insert variants of filter inserts according to the invention, wherein different filter elements have correlated therewith a combination of the following feature variants, respectively:

a) The groove of the filter element is provided on none of, on one of, or on both of the filter element sides.

b) The rib of the filter housing is provided on none of, on one of, or on both of the filter housing sidewalls.

c) At least one of the clamping surfaces and the matching contact surface of the filter insert have a height profile that differs from the height profile of other filter devices of the product group.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
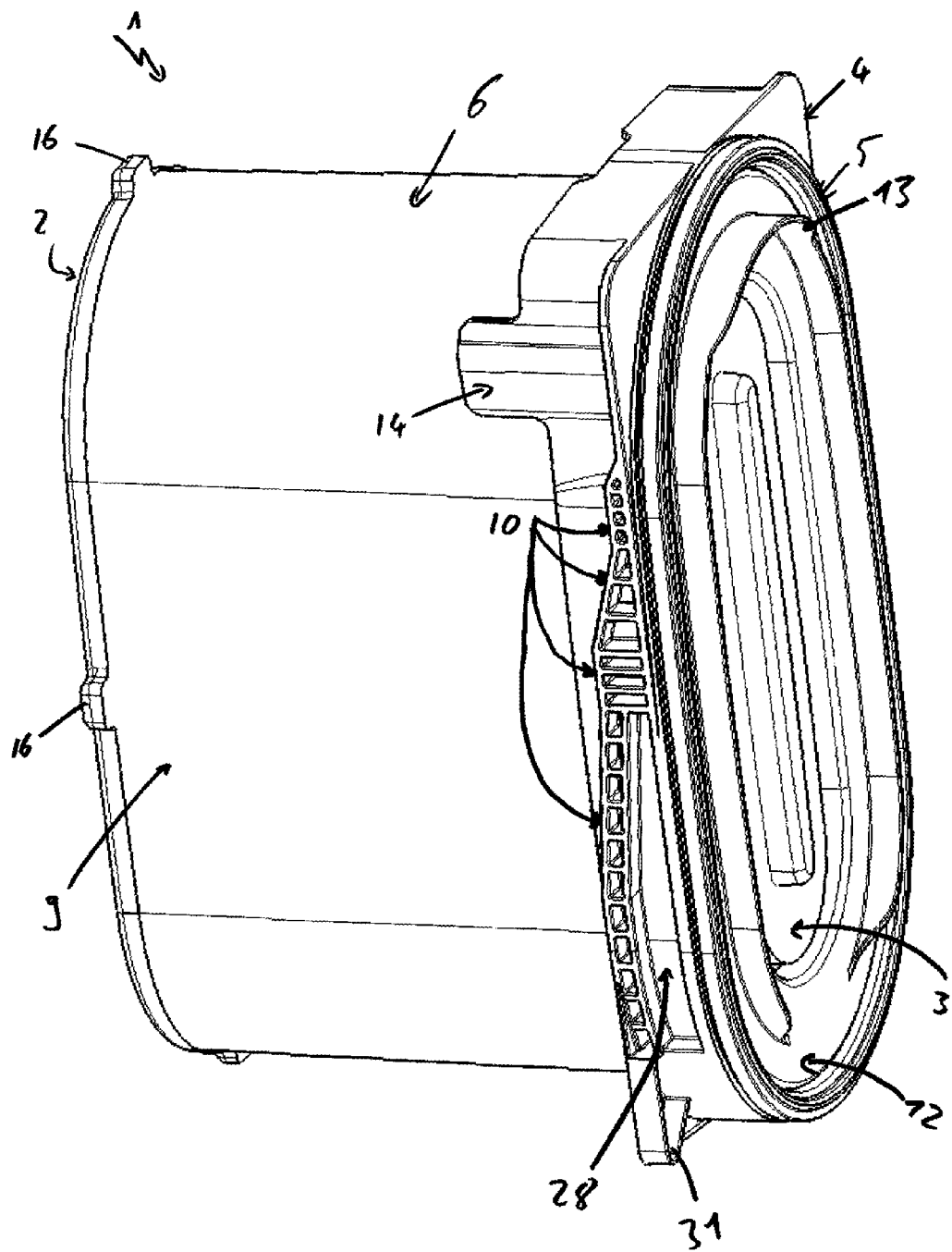
FIG. 1 shows an embodiment of a filter insert 1 according to the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to filter insert and a filter device as discussed in the summary above. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 5:
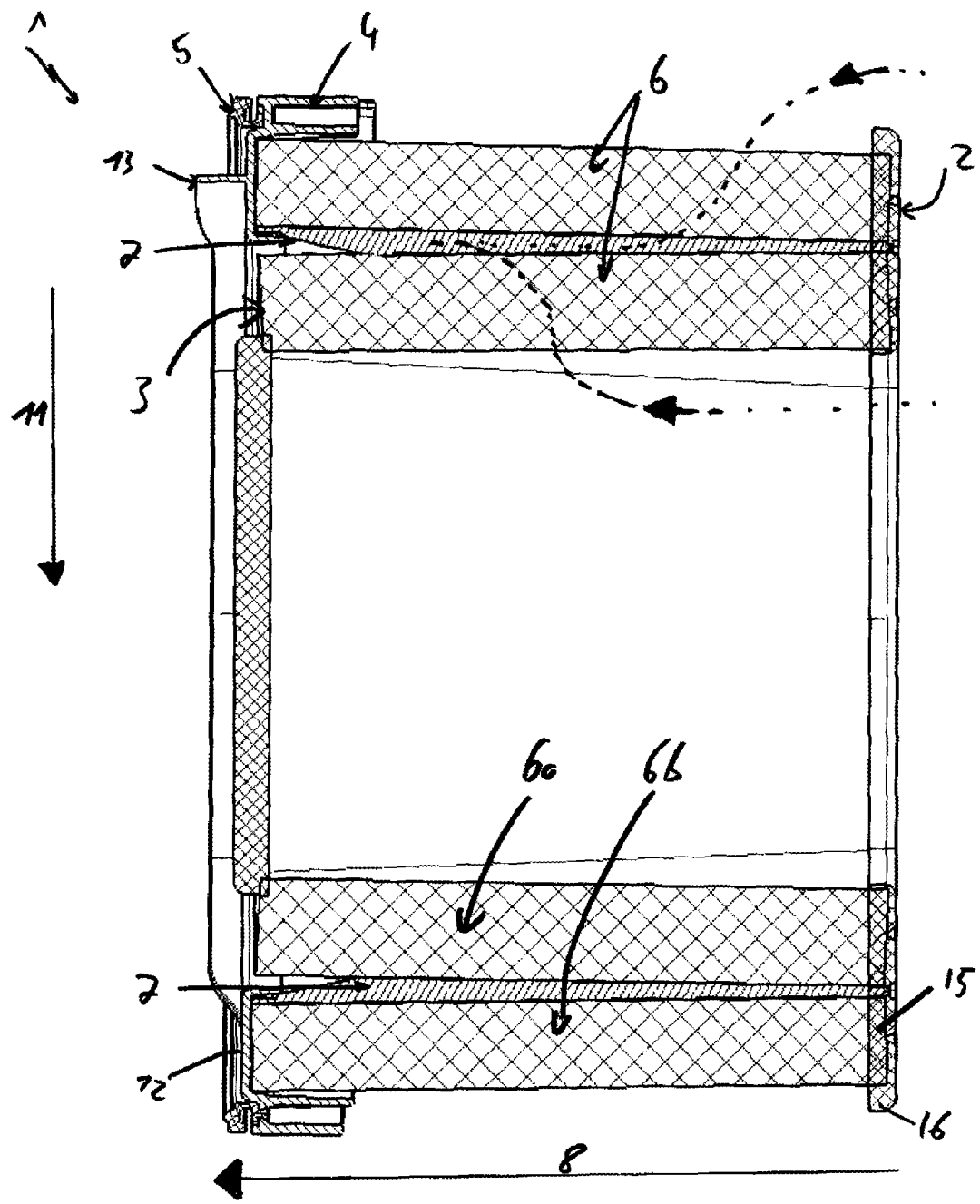
FIG. 5 shows a section of a filter insert according to the invention.

FIG. 1 and FIG. 5 show an embodiment of a filter insert 1 according to the invention. In this embodiment, on the end surface 3 of the filter element 6 at the outlet side a frame 4 is arranged that supports an axially acting seal 5. The filter element 6 is comprised of two star-shape folded annular filter media bellows 6a and 6b. The filter media bellows each have an oval cross-section with two straight parallel sections positioned opposite one another. A smaller filter media bellows 6a is concentrically arranged within the annular space that is enclosed by the larger filter media bellows 6b such that between the filter media bellows a flow passage 7 is provided for the medium to be filtered that is passing through.

In the area of the end surface 3 at the outlet side of the filter element 6 the flow passage 7 provides the outflow opening of the filter element 6, while at the end surface 2 at the inlet side the filter media bellows 6a, 6b are seal tightly connected with one another. The interior of the smaller filter media bellows 6a is closed off seal-tightly in the area of the end surface 3 at the outlet side by an end disk or a similar structural element.

In this way, the larger filter media bellows 6b is flowed through from the exterior to the interior and the inner filter media bellows 6a from the interior to the exterior.

In this way, by means of the filter insert 1a deflection of the flow is achieved wherein the flow deviates from the main flow direction 8 that is defined by the connection of the end surface 2 at the inlet side to the end surface 3 at the outlet side.

The frame 4 surrounds in the area of the end surface 3 at the outlet side the lateral sides of the filter element 6, wherein the frame 4 by means of four projecting members extending along the straight (or only slightly curved) lateral sides 9 of the filter element 6 forms a rectangular cross-section.

Along the straight lateral sides 9 of the filter element 6 the frame has a contact surface 10, respectively, for clamping the filter insert in a housing, wherein the contact surfaces are oriented opposite to the sealing direction and opposite to the main flow direction 8.

The contact surfaces 10 have along the lateral sides 9 a height profile wherein the contact surfaces in some areas of the height profile have, relative to the surface, a perpendicular that is not parallel to the main flow direction but is positioned at an angle thereto. In the illustrated embodiment the height profile has planar sections that extend parallel to the end surface 3 at the outlet side and moreover slanted sections that have along the straight lateral sides 9 in the mounting direction a positive slant, wherein the height or the spacing of the contact surface to the end surface at the outlet side increases.

The mounting direction thus defines a preferred direction along which the height primarily increases.

The contact surfaces are designed such that they can be brought into contact with clamping elements in a filter housing, wherein the clamping elements have a height profile matching the height profile of the contact surfaces so that in the mounted state a positive locking action between the height profiles is generated.

The two height profiles along the straight lateral sides of the filter element 6 differ in their geometry such that on the two sides a clamping element with a different matching shape must be employed, respectively.

In one embodiment of the filter insert according to the invention, on the contact surface several slanted and planar sections arranged in a step-like fashion are alternatingly and sequentially arranged. This has the advantage that only at the end of the insertion process the corresponding planar sections of the contact surfaces of the filter insert and of the clamping surfaces of the clamping brackets rest against one another. In this way, the force required for clamping the seal is produced only at the end of the insertion process. In this way, a minimal required force expenditure for mounting the filter insert is achieved. Moreover, the distance across which the surfaces rub against one another is minimal so that the risk of fusing by frictional heat is minimized.

In one embodiment, the planar sections of the contact surface on either side of the filter element can be arranged stepwise at the same height but at different positions along the mounting direction.

Beginning at the end that is leading in the insertion direction 11, grooves 28 are arranged on the frame 4 that extend parallel to the plane that is defined by the seal 5 between the end surface 3 at the outlet side and the contact surfaces 10. They can be engaged by a rib provided at the housing in the form of a tongue so that the risk of canting upon mounting of the filter insert is reduced.

At the end surface 3 of the filter element 6 at the outlet side, the frame 4 forms an end disk 12 that covers the end face of the larger filter media bellows 6b. On this end disk 12, the axially acting seal 5 is arranged whose shape matches the outer contour of the larger filter media bellows 6b. Inside the seal, a circumferentially extending rib 13 is provided that projects axially away from the end disk 12 and extends especially at identical spacing relative to the seal about the flow passage 7. At the end of the frame pointing in the insertion direction 11 the annular rib 13 is lowered; at the opposite end the circumferential rib 13 is raised relative to the remaining area. In this connection, the rib 13 projects past the seal with the areas that are not lowered. The plane that is defined in the undeformed state by the contact surface of the seal is thus intercepted by the circumferentially extending rib 13.

In one embodiment of the invention, the frame at the end of the filter insert opposite to the insertion direction 11 has two guiding protrusions 14 that extend opposite to the main flow direction away from the end disk 12 and have a greater spacing from the straight lateral sides 9 or their imaginary extension than the adjoining areas of the frame. These guiding protrusions serve for guiding the clamping brackets upon insertion of the filter insert such that these clamping brackets are inserted straight and without canting. The protrusions may prevent in particular mounting of the filter insert in a direction opposite to the intended insertion direction of the filter insert.

The end faces of the filter media bellows 6a, 6b at the inlet side are seal-tightly connected to one another by means of an end disk 15 of flexible material, for example, foamed PUR, whereby the end faces are completely sealed. This end disk has in the area of the straight lateral sides 9 as well as in the area of the ends of the filter insert, monolithically formed spacer knobs 16 that ensure a flexible vibration-resistant support of the filter insert in a housing.

Figure 2:
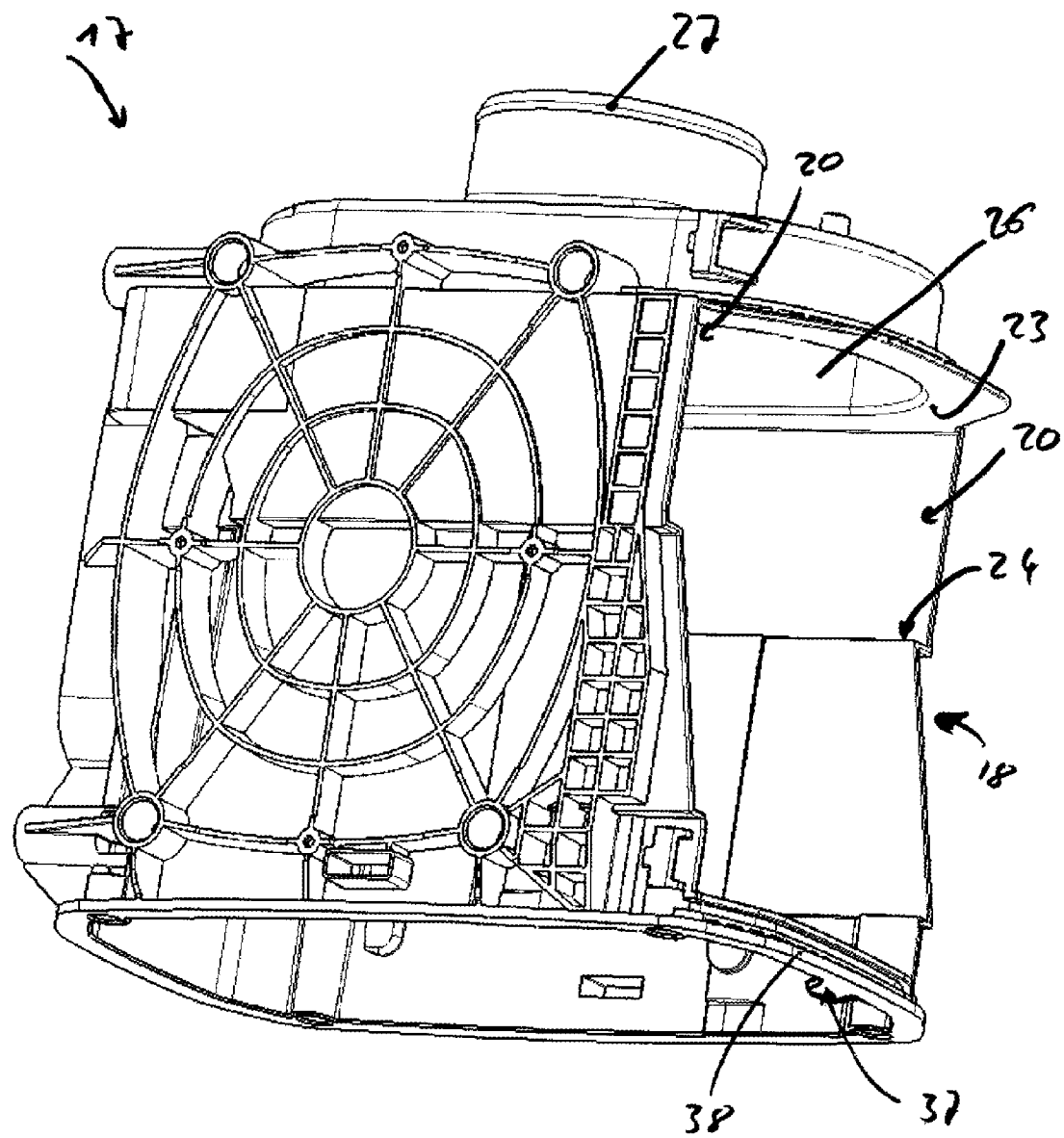
FIG. 2 shows a housing of a filter device according to the invention.
Figure 3:
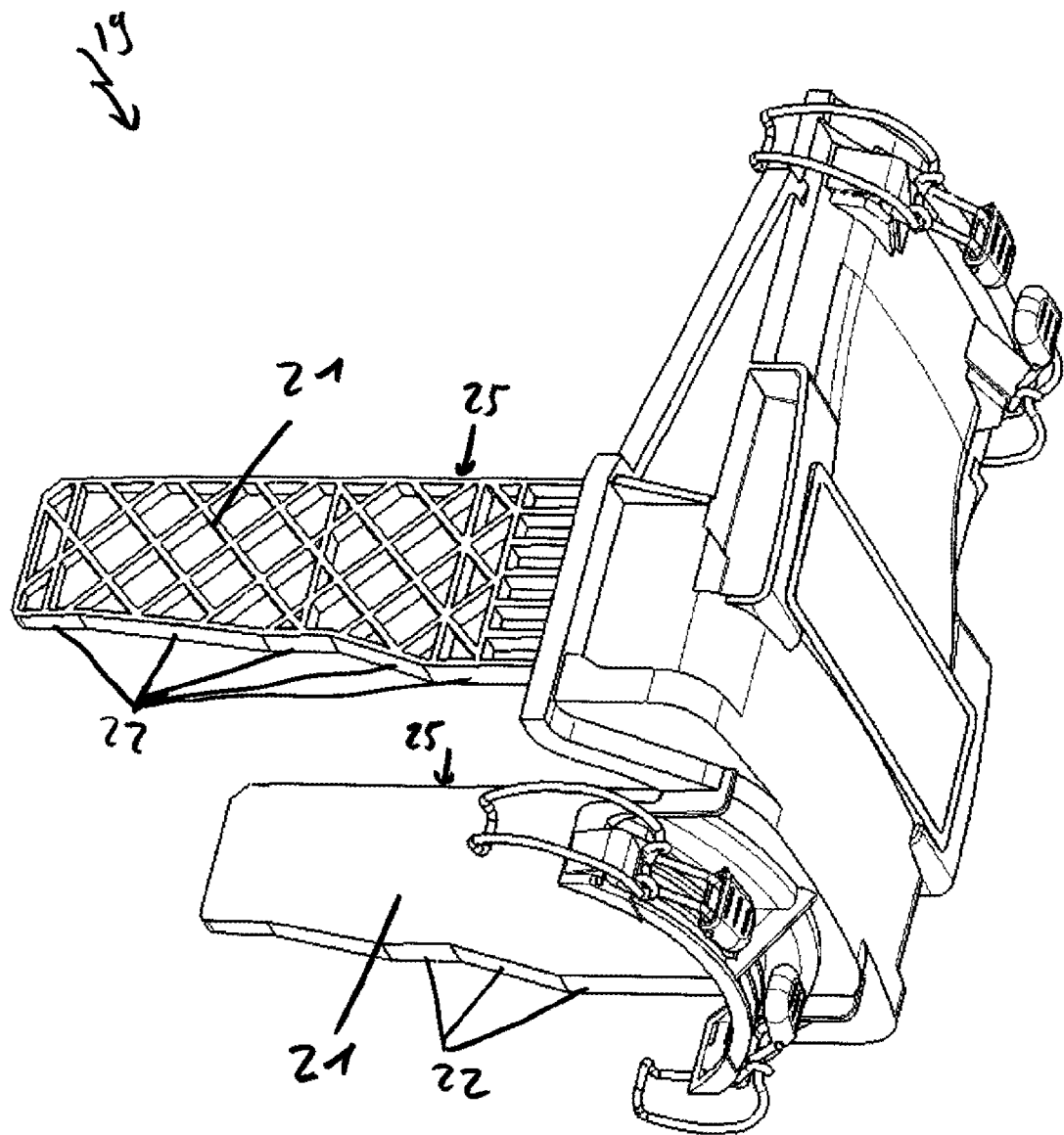
FIG. 3 shows a lid of a housing of a filter device according to the invention.

FIG. 2 shows a housing 17 of a filter device according to the invention. In the upper area the filter housing has a mounting opening 18 through which a filter insert 1 in the mounting direction 11 is inserted from top to bottom. The mounting opening illustrated in FIG. 2 is closable by the lid 19 illustrated in FIG. 3. In the housing 17 two expanded housing sections 20 are provided into which the clamping brackets 21 connected to the lid 19 can be inserted. The clamping brackets have clamping surfaces 22 that each have a height profile that can be brought into positive locking engagement with a height profile of the corresponding contact surfaces 10 of the filter insert 1, wherein the corresponding height profiles each form relative to one another a counter shape. In the illustrated embodiment, the height profiles each have slanted and straight sections that rest against one another in the mounted state.

In one embodiment, the mounting opening is delimited at the inlet side by a bow member 38 on which a tilting rib 37 projecting into the interior is arranged where the filter insert 1 will impinge when it is tilted within the housing. In this way, it is prevented that the filter insert can be caught on the bow member 38 upon removal.

The expanded housing sections 20 are provided on the side opposite the sealing surface 23 with planar support surfaces 24 on which the clamping brackets 21 are supported with matching planar support surfaces 25. In the interior that adjoins the sealing surface, the mounting opening 18 is recessed downwardly, i.e., in the mounting direction, in order to enable easy insertion of the filter insert 1 in tight spaces. In an alternative embodiment, the support surfaces 24 at the housing and the corresponding support surfaces 25 of the clamping brackets 21 may also have one of the profiles proposed for the clamping surfaces 22.

In the main flow direction inside the sealing surface and adjoining it, there is a mounting space 26 for a secondary air filter element 33. The opening of the mounting space 26 is embodied with respect to its geometry such that it can receive the circumferentially extending rib 13 of the filter insert 1 and surround it with a gap of in particular a width of 1-5 mm. A loosely inserted, not yet clamped filter insert is prevented in this way from falling out in case of an overhead arrangement.

The clean air outlet 27 adjoins the mounting space 26.

Figure 4:
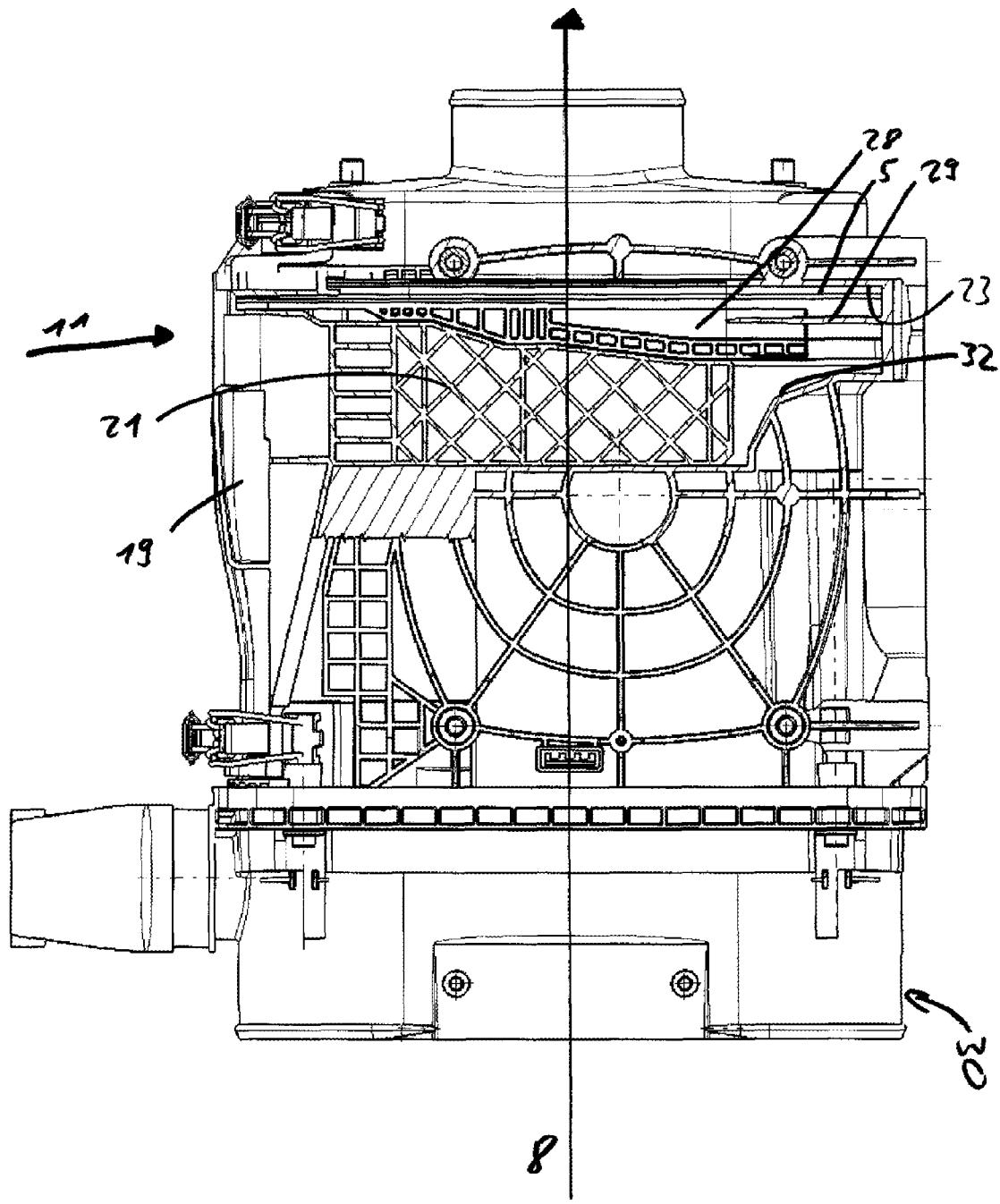
FIG. 4 shows a partial section of an embodiment of the filter device according to the invention with a cyclone arrangement according to the invention.

FIG. 4 shows a partial section of an embodiment of a filter device according to the invention wherein the filter insert is clamped and secured, i.e., the seal 5 has been compressed upon insertion of the clamping brackets 21 in that the clamping brackets 21 provide a support action along the contact surfaces 10 of the filter insert and the support surfaces of the expanded housing section 20.

The ribs 29 at the housing engage with play the grooves 28 of the frame 4. Upon insertion of the filter insert into the housing 17, at the beginning of the insertion process, the seal 5 is kept at a distance from the sealing surface 23 in that the circumferential rib 13 is resting on the upper area of the sealing surface 23. Upon further insertion the movement play that is available to the filter insert, for example, by the recessed mounting opening 18, is limited in order to prevent canting of the filter insert. This is achieved in that the guiding projections 31 provided on the frame and extending in the insertion direction 11 impinge on at least one guide ramp 32 that moves the filter insert 1 upon further insertion shortly before the end of the insertion process in the direction toward the sealing surface 23. Subsequently, the ribs 29 of the housing engage the grooves 28 of the frame wherein, on the one hand, the freedom of movement of the filter insert is limited to such an extent that the probability of canting of the filter insert in the housing 17 is reduced but, on the other hand, sufficient play is available in order not to press the seal prematurely against the sealing surface so that the risk of folding or canting of the seal 5 is reduced. At the end of the insertion process, the raised portion of the circumferential rib 13 engages the mounting space 26 of the secondary air filter element and prevents in this way, in case of overhead mounting, the filter insert from falling out before the lid is mounted.

After prepositioning the filter insert 1, the lid 19 can be mounted wherein the clamping brackets first are guided by the guiding protrusions 14 so that the risk of canting of the clamping brackets is reduced. As soon as the clamping surfaces 22 of the clamping brackets 21 come into contact with the contact surfaces 10 of the filter insert, the filter insert is moved in the direction toward the sealing surface 23 and the seal 5 is pressed against the sealing surface 23 so that the raw side of the filter device is seal-tightly separated from the clean side.

In one embodiment, the filter device comprises a pre-separator at the inlet side, as shown in FIG. 4. The pre-separator comprises a two-part cyclone block 30 that comprises several small individual cyclones.

Figure 6:
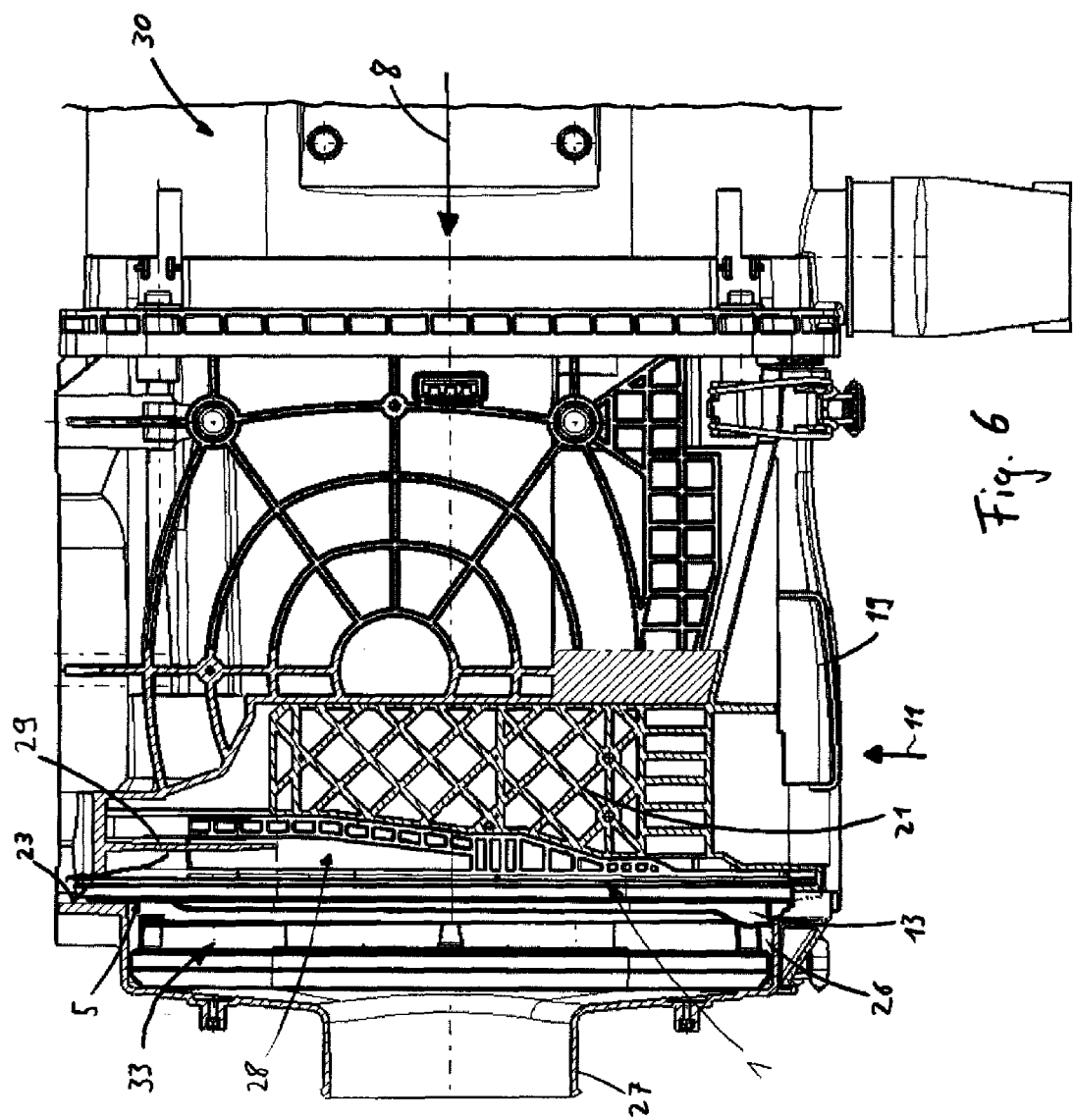
FIG. 6 shows a further section of a filter insert according to the invention.

FIG. 6 shows a further section of an embodiment of a filter insert according to the invention in a filter device according to the invention along a section line that is modified relative to FIG. 4. In the mounting space 26, shown in section, a secondary filter element 33 is arranged that has a circumferential radial seal that clamps the secondary filter element 33 in the mounting space in a fluid-tight way. The circumferential rib of the filter element 1 engages the mounting space 26. Moreover, it is apparent that the seal 5 is pressed against the sealing surface in the sealing direction wherein, in this embodiment, the sealing direction corresponds to the main flow direction 8.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter insert, comprising:
   a filter element with an end surface at an inlet side and an end surface at an outlet side, wherein said end surface at said inlet side and said end surface at said outlet side are spaced from one another in a main flow direction of the filter insert;
   a frame circumferentially extending about lateral sides of said filter element and connected to said filter element;
   an axial seal supported on said frame, wherein said seal has a sealing direction in or opposite to said main flow direction and, when inserted into a filter housing and contacting a sealing surface of the filter housing in said sealing direction, said seal separates seal-tightly said inlet side from said outlet side;

said frame having on two opposite ones of said lateral sides of said filter element a first contact surface and a second contact surface for clamping the filter insert by a first clamping element and a second clamping element;

said first and second contact surfaces substantially oriented opposite to said sealing direction;

said first and second contact surfaces each having an individual profile of varying height extending along said two opposite lateral sides;

wherein said filter element comprises at least one annular star-shaped folded filter medium.

2. The filter insert according to claim 1, wherein a height of said profiles of varying height is defined by a spacing of sections of said first and second contact surfaces from a plane defined by said seal.

3. The filter insert according to claim 2, wherein said profiles of varying height along said two opposite lateral sides have a common preferred direction along which said profiles of varying height extend and across which said height primarily increases,
wherein the increase of said height is continuous or stepwise.

4. The filter insert according to claim 3, wherein said preferred direction is a mounting direction of the filter insert for insertion into the filter housing.

5. The filter insert according to claim 3, wherein said two opposite lateral sides are substantially planar or slightly elliptical.

6. The filter insert according to claim 1, wherein said filter element comprises a first and a second annular star-shaped folded filter medium bellows,
wherein said first filter medium bellows is smaller than said second filter medium bellows and is arranged concentrically inside said second filter medium bellows,
wherein said frame is seal-tightly connected to said second filter medium bellows at a first one of said end surfaces and an interior of said first filter medium bellows is completely closed off at said first one of said end faces, and
wherein end faces of said first and said second filter medium bellows are seal-tightly connected to one another at a second one of said end surfaces.

7. A filter insert, comprising:
a filter element with an end surface at an inlet side and an end surface at an outlet side, wherein said end surface at said inlet side and said end surface at said outlet side are spaced from one another in a main flow direction of the filter insert;
a frame circumferentially extending about lateral sides of said filter element and connected to said filter element;
an axial seal supported on said frame, wherein said seal has a sealing direction in or opposite to said main flow direction and, when inserted into a filter housing and contacting a sealing surface of the filter housing in said sealing direction, said seal separates seal-tightly said inlet side from said outlet side;
said frame having on two opposite ones of said lateral sides of said filter element a first contact surface and a second contact surface for clamping the filter insert by a first clamping element and a second clamping element;
said first and second contact surfaces substantially oriented opposite to said sealing direction;

said first and second contact surfaces each having an individual profile of varying height extending along said two opposite lateral sides;
wherein a height of said profiles of varying height is defined by a spacing of sections of said first and second contact surfaces from a plane defined by said seal;
wherein said profiles of varying height along said two opposite lateral sides have a common preferred direction along which said profiles of varying height extend and across which said height primarily increases;
wherein the increase of said height is continuous or stepwise;
wherein said frame in an area of said two opposite lateral sides has at least one groove that extends parallel to a plane defined by said seal between said plane of said seal and said first and second contact surfaces and undercuts in a direction opposite to said preferred direction a portion of said profile of varying height.

8. A filter insert, comprising:
a filter element with an end surface at an inlet side and an end surface at an outlet side, wherein said end surface at said inlet side and said end surface at said outlet side are spaced from one another in a main flow direction of the filter insert;
a frame circumferentially extending about lateral sides of said filter element and connected to said filter element;
an axial seal supported on said frame, wherein said seal has a sealing direction in or opposite to said main flow direction and, when inserted into a filter housing and contacting a sealing surface of the filter housing in said sealing direction, said seal separates seal-tightly said inlet side from said outlet side;
said frame having on two opposite ones of said lateral sides of said filter element a first contact surface and a second contact surface for clamping the filter insert by a first clamping element and a second clamping element;
said first and second contact surfaces substantially oriented opposite to said sealing direction;
said first and second contact surfaces each having an individual profile of varying height extending along said two opposite lateral sides;
wherein said frame comprises an annular end disk and is arranged at said end surface at said inlet side or said end surface at said outlet side,
wherein said annular end disk covers partially said end surface and provides a flow-through opening,
wherein said seal is arranged on said annular end disk,
wherein said annular end disk has an annular rib that extends partially or completely circumferentially within an area of said annular end disk inside said seal,
wherein said annular rib projects away from said annular end disk and intercepts a surface that is defined by an engagement surface of said seal in an unclamped state of said seal.

9. The filter insert according to claim 8, wherein said frame at a level of said annular end disk has a first and a second guiding projections that project in a mounting direction of the filter insert.

10. The filter insert according to claim 8, wherein said filter element has at least two spacer knobs of elastic material on said lateral sides at an end opposite said frame.

11. The filter insert according to claim 8, wherein said filter element is a compact air filter element with a plurality of passages that are closed off alternatingly at said end surfaces.

12. The filter insert according to claim 8, wherein
said filter element is a rectangular zigzag-folded filter element and wherein said end surfaces are formed by fold edges.

13. A filter insert comprising:
a filter element with an end surface at an inlet side and an end surface at an outlet side;
a frame circumferentially extending about lateral sides of said filter element and connected to said filter element;
an axial seal supported on said frame, wherein said seal is adapted to be pressed against a sealing surface of a filter housing in a sealing direction;
said frame having
  a first contact surface arranged at a first lateral side of the filter element; and
  a second contact surface arranged at an opposing second lateral side of the filter element;
wherein the first contact surface and the second contact surface are for clamping the filter insert by a first clamping element and a second clamping element in the filter housing;
wherein normals of said contact surfaces are oriented substantially opposite to said sealing direction;
wherein the first contact surface has a plurality of contact surface sections having a varying height or spacing relative to a plane defined by said seal;
wherein the first contact surface has a first varying height profile defined by varying height of the plurality of contact surface sections along the first contact surface, the varying height relative to a plane defined by said seal;
wherein the second contact surface has a plurality of contact surface sections having a varying height or spacing relative to a plane defined by said seal;
wherein the second contact surface has a second varying height profile defined by varying height of the plurality of contact surface sections along the second contact surface, the varying height relative to a plane defined by said seal;
wherein the first varying height profile of the first contact surface is different than the second varying height profile of the second contact surface;
wherein the filter insert is clamped by said first and second clamping elements having a counter profile, respectively, relative to said first and second profiles of varying height in the filter housing.

14. A filter insert, comprising:
a filter element with an end surface at an inlet side and an end surface at an outlet side;
a frame circumferentially extending about lateral sides of said filter element and connected to said filter element;
an axial seal supported on said frame, wherein said seal is adapted to be pressed against a sealing surface of a filter housing in a sealing direction;
said frame having on two opposite lateral sides of said filter element a first contact surface and a second contact surface for clamping the filter insert by a first clamping element and a second clamping element in the filter housing;
wherein normals of said contact surfaces are oriented substantially opposite to said sealing direction;
said first contact surface having a first profile of varying height and said second contact surface having a second profile of varying height that is different from said first profile of varying height;
wherein the filter insert is clamped by said first and second clamping elements having a counter profile, respectively, relative to said first and second profiles of varying height in the filter housing;
wherein a height of said profiles of varying height is defined by a spacing of sections of said first and second contact surfaces from a plane defined by said seal;
wherein said profiles of varying height along said two opposite lateral sides have a common preferred direction along which said profiles of varying height extend and across which said height primarily increases, wherein the increase of said height is continuous or stepwise;
wherein said frame in an area of said two opposite lateral sides has at least one groove that extends parallel to a plane defined by said seal between said plane of said seal and said first and second contact surfaces and undercuts in a direction opposite to said preferred direction a portion of said profile of varying height.

15. The filter insert according to claim 14, wherein
said filter element is a compact air filter element with a plurality of passages that are closed off alternatingly at said end surfaces.

16. The filter insert according to claim 14, wherein
said filter element is a rectangular zigzag-folded filter element and wherein said end surfaces are formed by fold edges.

17. A filter insert, comprising:
a filter element with an end surface at an inlet side and an end surface at an outlet side;
a frame circumferentially extending about lateral sides of said filter element and connected to said filter element;
an axial seal supported on said frame, wherein said seal is adapted to be pressed against a sealing surface of a filter housing in a sealing direction;
said frame having on two opposite lateral sides of said filter element a first contact surface and a second contact surface for clamping the filter insert by a first clamping element and a second clamping element in the filter housing;
wherein normals of said contact surfaces are oriented substantially opposite to said sealing direction;
said first contact surface having a first profile of varying height and said second contact surface having a second profile of varying height that is different from said first profile of varying height;
wherein the filter insert is clamped by said first and second clamping elements having a counter profile, respectively, relative to said first and second profiles of varying height in the filter housing;
wherein said frame comprises an annular end disk and is arranged at said end surface at said inlet side or said end surface at said outlet side,
wherein said annular end disk covers partially said end surface and provides a flow-through opening,
wherein said seal is arranged on said annular end disk,
wherein said annular end disk has an annular rib that extends partially or completely circumferentially within an area of said annular end disk inside said seal,
wherein said annular rib projects away from said annular end disk and intercepts a surface that is defined by an engagement surface of said seal in an unclamped state of said seal.

18. The filter insert according to claim 17, wherein said frame at a level of said annular end disk has a first and a second guiding projections that project in a mounting direction of the filter insert.

19. The filter insert according to claim 17, wherein
said filter element has at least two spacer knobs of elastic material on said lateral sides at an end opposite said frame.

20. A filter insert, comprising:
a filter element with an end surface at an inlet side and an end surface at an outlet side;
a frame circumferentially extending about lateral sides of said filter element and connected to said filter element;
an axial seal supported on said frame, wherein said seal is adapted to be pressed against a sealing surface of a filter housing in a sealing direction;
said frame having on two opposite lateral sides of said filter element a first contact surface and a second contact surface for clamping the filter insert by a first clamping element and a second clamping element in the filter housing;
wherein normals of said contact surfaces are oriented substantially opposite to said sealing direction;
said first contact surface having a first profile of varying height and said second contact surface having a second profile of varying height that is different from said first profile of varying height;
wherein the filter insert is clamped by said first and second clamping elements having a counter profile, respectively, relative to said first and second profiles of varying height in the filter housing;
wherein said filter element comprises at least one annular star-shaped folded filter medium.

21. The filter insert according to claim 20, wherein
a height of said profiles of varying height is defined by a spacing of sections of said first and second contact surfaces from a plane defined by said seal.

22. The filter insert according to claim 21, wherein
said profiles of varying height along said two opposite lateral sides have a common preferred direction along which said profiles of varying height extend and across which said height primarily increases, wherein the increase of said height is continuous or stepwise.

23. The filter insert according to claim 22, wherein
said preferred direction is a mounting direction of the filter insert for insertion into the filter housing.

24. The filter insert according to claim 22, wherein said two opposite lateral sides are substantially planar or slightly elliptical.

25. The filter insert according to claim 20, wherein
said filter element comprises a first and a second annular star-shaped folded filter medium bellows,
wherein said first filter medium bellows is smaller than said second filter medium bellows and is arranged concentrically inside said second filter medium bellows,
wherein said frame is seal-tightly connected to said second filter medium bellows at a first one of said end surfaces and an interior of said first filter medium bellows is completely closed off at said first one of said end faces, and
wherein end faces of said first and said second filter medium bellows are seal-tightly connected to one another at a second one of said end surfaces.

26. A filter device, comprising:
a filter insert including:
a filter element with an end surface at an inlet side and an end surface at an outlet side, wherein said end surface at said inlet side and said end surface at said outlet side are spaced from one another in a main flow direction of the filter insert;
a frame circumferentially extending about lateral sides of said filter element and connected to said filter element;
an axial seal supported on said frame, wherein said seal has a sealing direction in or opposite to said main flow direction and, when inserted into a filter housing and contacting a sealing surface of the filter housing in said sealing direction, said seal separates seal-tightly said inlet side from said outlet side;
said frame having on two opposite ones of said lateral sides of said filter element a first contact surface and a second contact surface for clamping the filter insert by a first clamping element and a second clamping element;
said first and second contact surfaces substantially oriented opposite to said sealing direction; and
said first and second contact surfaces each having an individual profile of varying height extending along said two opposite lateral sides;
a filter housing having an inlet area and an outlet area for a medium to be filtered, wherein said inlet area or said outlet area has a receiving area with an annular sealing surface that matches said seal of said filter insert; and
a lid;
wherein said filter housing has a mounting opening through which said filter insert is insertable in a mounting direction that is perpendicular to a main flow direction into said filter housing;
said mounting opening is closable by said lid;
said lid comprises a first and a second clamping brackets that project into said filter housing, wherein said first clamping bracket extends across a first lateral side of said filter insert and said second clamping bracket extends across a second lateral side of said filter insert;
said first and second clamping brackets each have clamping surfaces oriented in a direction of said receiving area;
wherein said clamping surfaces each have a profile of varying height, wherein said profiles of varying height of said first and second clamping surfaces match said profiles of varying height of said contact surfaces on said frame and form a matching shape, respectively;
when said lid is mounted and said first and second clamping brackets project completely into said filter housing, said first and second clamping brackets apply a force onto said contact surfaces of said filter insert in such a way that said seal of said filter insert is pressed against said sealing surface of said filter housing and said filter insert is positionally secured in said filter housing;
wherein said filter housing has an opening inside said sealing surface,
wherein said opening is designed such that said opening surrounds an annular rib, extending partially or completely on an end disk of said filter insert, when said filter insert is completely inserted in said mounting direction into said filter housing.

27. The filter device according to claim 26, wherein
said filter housing has housing sidewalls with two expanded housing sections that each have a planar support surface facing said receiving area,
wherein said first and second clamping brackets have planar support surfaces opposite said clamping surfaces and
wherein said planar support surfaces of said first and second clamping brackets rest on said planar support surfaces of said expanded housing sections.

28. The filter device according to claim 26, wherein
said filter housing has at least one rib that is arranged on a housing sidewall of said filter housing and beginning at a bottom of said filter housing extends in a direction toward said mounting opening,
wherein said at least one rib is designed such that, upon mounting of said filter insert, said at least one rib engages a groove of said filter insert.

29. The filter device according to claim 26, wherein
said filter housing has two opposed housing sidewalls each provided with a ramp having a ramp surface that is oriented in a direction toward said receiving area,
wherein a spacing of said ramp surface relative to a receiving surface of said receiving area is reduced in said mounting direction,
wherein guiding projections of an end disk of said filter insert upon mounting of said filter insert are guided by said ramp surfaces in a direction toward said receiving area,
wherein said filter insert is positioned such that a rib of said filter housing engages a groove provided on said filter insert.

30. The filter device according to claim 26, wherein said mounting opening on a side where said frame of said filter insert is received is cut deeper into a housing sidewall of said filter housing than in an area where an end of said filter insert opposite said frame is received.

* * * * *